L. CLABAUGH.
Fruit Jar.

No. 202,093. Patented April 9, 1878.

WITNESSES:
Geo. H. Vaillant.
Henry C. Hunter

INVENTOR
Levi Clabaugh,
by J. Snowden Bell
ATTORNEY

N. PETERS, PHOTO-LITHOGRAPHER, WASHINGTON, D.C.

UNITED STATES PATENT OFFICE.

LEVI CLABAUGH, OF WARRIOR'S MARK, PENNSYLVANIA.

IMPROVEMENT IN FRUIT-JARS.

Specification forming part of Letters Patent No. 202,093, dated April 9, 1878; application filed June 29, 1877.

*To all whom it may concern:*

Be it known that I, LEVI CLABAUGH, of Warrior's Mark, in the county of Huntingdon and State of Pennsylvania, have invented certain new and useful Improvements in Fruit-Jars, of which the following is a specification:

My improvements relate to that class of fruit-jars known as "reservoir fruit-jars," having a reservoir or compartment to contain sirup, which covers the fruit in the jar and prevents the access of air thereto; and the object of my invention is to provide simple and efficient means independently of the lid of the jar for effecting and maintaining a division between the compartments which contain the fruit and the sirup respectively.

To this end my improvements consist in combining, with a jar having an internal annular shelf or ledge or a series of lugs at or near the junction of its neck and body, and two stops or projections above said ledge, a perforated plate or disk for separating the fruit from the sirup compartment, said plate fitting between and being retained in position by the ledge and stops, and being recessed on its periphery, and provided with a stem or handle to admit of its insertion and withdrawal, all as hereinafter more fully set forth.

Figure 1:
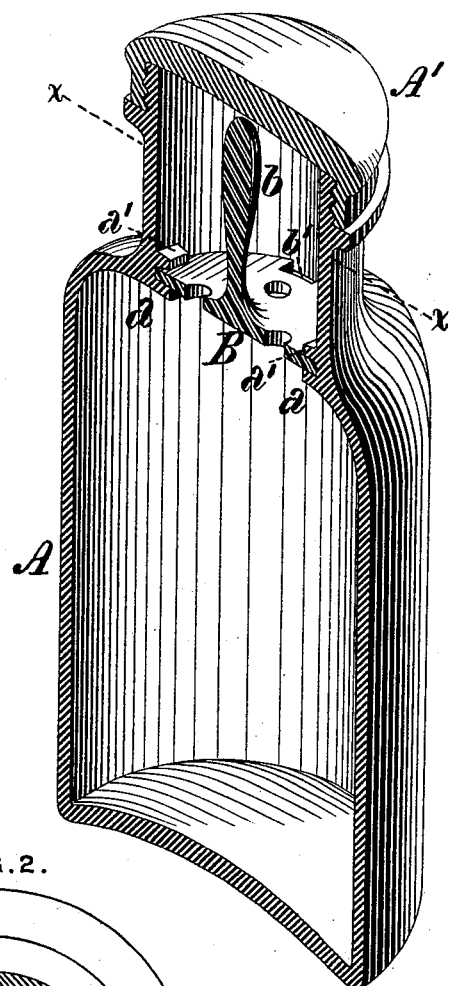
Figure 2:
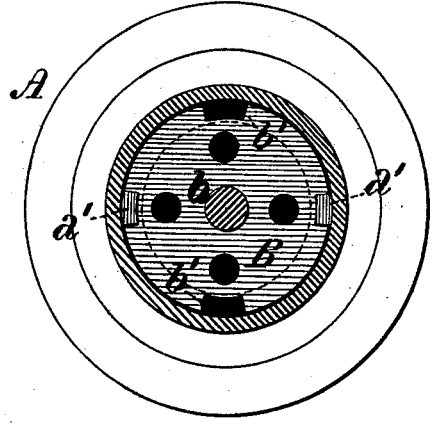
Figure 3:
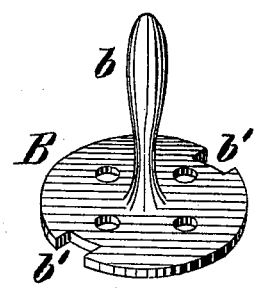

In the accompanying drawings, Figure 1 is an isometrical section of a fruit-jar embodying my improvements; Fig. 2, a horizontal section through the sirup-compartment, and Fig. 3 a view in perspective of the separating-plate detached.

The jar A, which otherwise may be of the ordinary construction, has an annular ledge or shelf, $a$, formed on the inside of its neck at the base thereof, and two stops or projecting lugs, $a'$, are formed upon the inside of the neck a short distance above the ledge $a$.

Instead of making a continuous ledge, as shown, two or more segmental lugs may be employed to fulfill its function, which is to act as a rest or support to a perforated separating-plate, B, the diameter of which is slightly less than the inside diameter of the neck of the jar, and its thickness such as to enable it to fit neatly between the ledge $a$ and stops $a'$.

A vertical stem or handle, $b$, is formed upon the plate B, and two recesses, $b'$ $b'$, are formed in the periphery of the plate, their length and depth being such as to allow them to pass by the stops $a'$, so as to admit of the insertion and removal of the plate, which, when turned so that said recesses will not be in the same vertical plane as the stops $a'$, will be retained in position by said stops while resting on the ledge or lugs $a$. The cap A' is put on in the ordinary manner, and has no connection to the plate B or its handle $b$.

In using my improved fruit-jar it is first filled with fruit up to the lower portion of the shelf $a$. The separating-plate B is then inserted and turned so as to be held in position by the stops $a'$, and then constitutes the dividing-partition between the body or fruit-compartment of the jar and the neck or sirup-reservoir. The latter is then filled with sirup and the lid or cover put on, and access of sirup to the fruit is permitted by the perforations of the plate, while the fruit is effectually preserved from contact with air.

I am aware that a perforated plate for separating the fruit and sirup compartments of a jar, said plate being either loose or attached to or held in position by the cap or cover, is not new, and do not, therefore, broadly claim such device.

I claim as my invention and desire to secure by Letters Patent—

The combination, with a fruit-jar having internal supports and stops, of a removable perforated separating-plate, fitting between and maintained in position by said supports and stops independently of the lid or cover, substantially as set forth.

LEVI CLABAUGH.

Witnesses:
J. SNOWDEN BELL,
GEO. A. VAILLANT.